United States Patent
Gunjian

(10) Patent No.: US 10,779,636 B2
(45) Date of Patent: Sep. 22, 2020

(54) TWISTED WIRE GRILL BRUSH HAVING AT LEAST THREE BRUSHES AND MULTI-HANDLED TWISTED WIRE GRILL BRUSH INCLUDING SAME

(71) Applicant: Brushtech, Inc., Plattsburgh, NY (US)

(72) Inventor: Zaven Gunjian, Plattsburgh, NY (US)

(73) Assignee: Brushtech, Inc., Plattsburgh, NY (US)

( * ) Notice: Subject to any disclaimer, the term of this patent is extended or adjusted under 35 U.S.C. 154(b) by 120 days.

(21) Appl. No.: 15/914,302

(22) Filed: Mar. 7, 2018

(65) Prior Publication Data

US 2019/0274418 A1 Sep. 12, 2019

(51) Int. Cl.
| | |
|---|---|
| *A47J 37/07* | (2006.01) |
| *A46B 5/02* | (2006.01) |
| *A46B 5/00* | (2006.01) |
| *A46D 1/00* | (2006.01) |
| *A46B 3/18* | (2006.01) |

(52) U.S. Cl.
CPC .............. *A46B 5/02* (2013.01); *A46B 3/18* (2013.01); *A46B 5/00* (2013.01); *A46B 5/0008* (2013.01); *A46D 1/0207* (2013.01); *A46B 2200/3093* (2013.01); *A47J 37/07* (2013.01)

(58) Field of Classification Search
CPC ....... A46B 3/18; A46B 5/0008; A46B 5/0012; A47J 37/0786
See application file for complete search history.

(56) References Cited

U.S. PATENT DOCUMENTS

| | | | |
|---|---|---|---|
| 627,421 A * | 6/1899 | Howe | A46B 11/0013 401/276 |
| 1,683,947 A * | 9/1928 | Barchfeld | A46B 3/18 15/206 |
| 4,819,291 A | 4/1989 | Gunjian | |
| 5,070,569 A * | 12/1991 | Wilkins | A46B 7/02 15/160 |
| 7,089,946 B2 * | 8/2006 | Rousselet | A46B 3/18 132/218 |
| D664,771 S | 8/2012 | Gunjian | |
| D690,116 S | 9/2013 | Zemel et al. | |
| D691,379 S | 10/2013 | Gunjian | |
| D695,019 S | 12/2013 | Zemel et al. | |
| D700,438 S * | 3/2014 | Borovicka | D4/131 |
| D701,389 S | 3/2014 | Gunjian | |
| D714,557 S * | 10/2014 | Gonzalez | D4/131 |
| 9,101,205 B2 | 8/2015 | Gunjian | |
| D742,121 S * | 11/2015 | Borovicka | D4/119 |
| D766,585 S * | 9/2016 | Cornett | D4/119 |
| D789,095 S | 6/2017 | Wales | |
| 10,099,260 B1 * | 10/2018 | Mowad | B08B 1/002 |
| 2008/0047086 A1 | 2/2008 | Gunjian | |
| 2008/0048485 A1 | 2/2008 | Gunjian | |
| 2015/0327659 A1 | 11/2015 | Gunjian | |
| 2017/0055689 A1* | 3/2017 | Gunjian | A46B 3/18 |

* cited by examiner

*Primary Examiner* — Michael D Jennings

(74) *Attorney, Agent, or Firm* — Burr & Brown, PLLC

(57) ABSTRACT

A twisted wire grill brush is provided, including at least one handle having an extension direction, a first brush provided at an end of the at least one handle, a second brush provided at the end of the at least one handle and arranged substantially parallel with respect to the first brush, and a third brush provided at the end of the at least one handle and arranged substantially perpendicular with respect to the extension direction of the at least one handle.

20 Claims, 9 Drawing Sheets

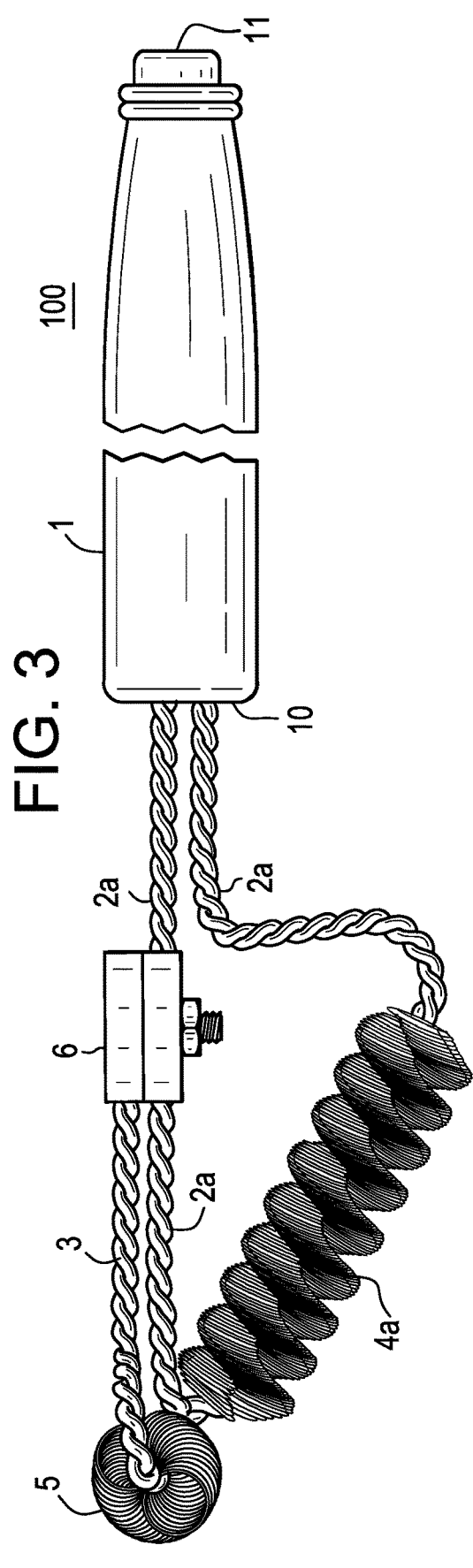
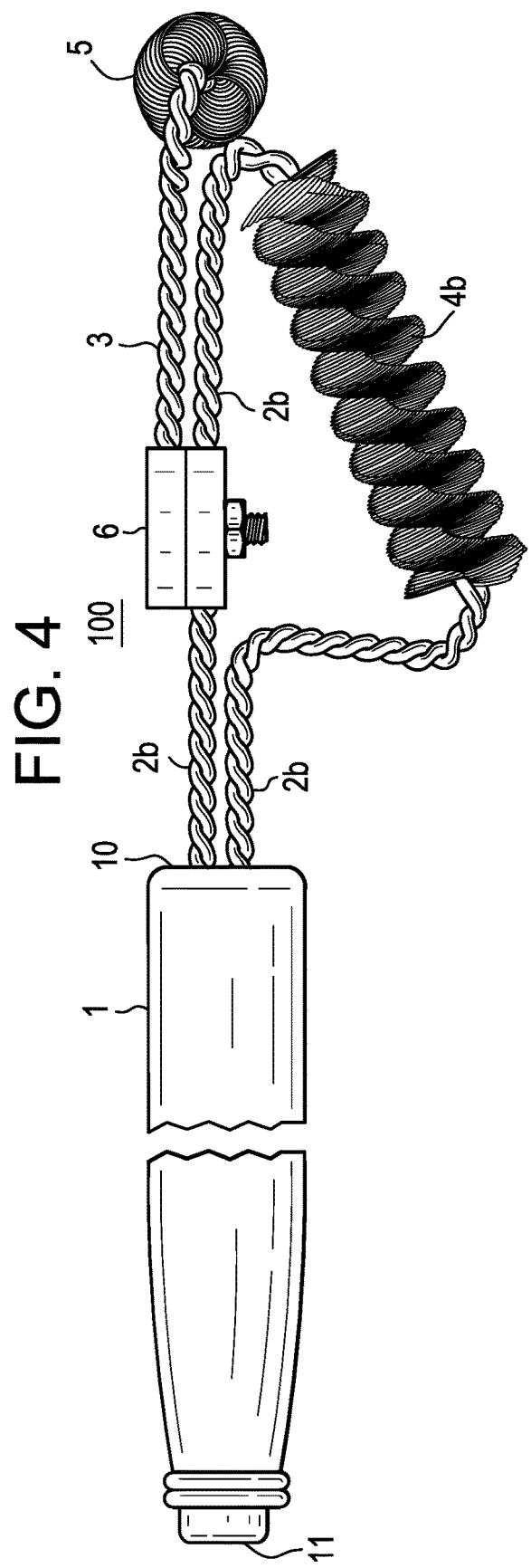
FIG. 3
FIG. 4

TWISTED WIRE GRILL BRUSH HAVING AT LEAST THREE BRUSHES AND MULTI-HANDLED TWISTED WIRE GRILL BRUSH INCLUDING SAME

FIELD OF THE INVENTION

The present invention relates to a twisted wire brush, and in particular, to a twisted wire brush for cleaning a grill having at least three brushes, and a multi-handled twisted wire grill brush including at least three brushes.

BACKGROUND OF THE INVENTION

Known twisted wire brushes typically comprise bristles that are held in place by, and which extend radially from, a twisted wire core. To form the twisted wire brush, the bristles are inserted between parallel wires while the wires are twisted to press the bristles therebetween. Depending on the intended application for a twisted wire brush, the density of the bristles and the surface area covered by the bristles can be varied by adjusting the number of bristles, by angling the bristles at multiple angles from the core axis, or by bending the twisted wire core into various shapes, for example. The bristles can be made of different materials having varying physical dimensions, flexibility, and other characteristics that may be suitable for the intended application.

In cleaning applications, where the conventional wire brushes are used with a relatively strong force to achieve the desired and necessary cleaning effect, the bristles can have a relatively thick diameter, can be made of metal, and can be substantially rigid. Despite the strength advantages provided by controlling the characteristics of cleaning brushes in this manner, the fact remains that conventional bristles wear over time, and can often bend, splinter, and break during continued use. As a result, such conventional wire brushes exhibit limited durability, and frequent use often requires regular replacement.

More concerning than wear-based replacement costs, however, is that in many instances, worn and damaged conventional wire brushes pose a serious health hazard. For example, in the case of grill brushes, a broken or detached bristle fragment can stick to a grilling surface on which food is cooked, and the broken/detached bristle can ultimately end up on or inside the cooked food and ingested. Such a food-borne bristle may cause the person who chews and/or swallows the bristle fragment to suffer significant internal injury or even death.

While some variations of a twisted wire brush, such as that disclosed in U.S. Pat. No. 9,101,205, are designed to overcome the disadvantages discussed above and provide a twisted wire brush having greater durability which is less prone to bristle damage, such twisted wire brushes still have a relatively limited (i.e., small) brush surface area that is available for cleaning (brushing/scrubbing) the grill surface. Accordingly, it would be desirable to provide a durable twisted wire grill brush that also has an increased brush surface area to improve cleaning efficiency.

Further, when the grill surface is extremely soiled, such that a greater degree of force is required in order to loosen and remove unwanted substances from the grill surface, it is often necessary for the person cleaning the grill to use two hands—one hand placed on the intended grill brush handle, and one hand placed on a portion of the brush itself, such as on the upper surface of the brush pad—in order to obtain the leverage required to get the amount of force needed to accomplish the cleaning task. Due to the fact that grill surfaces are typically cleaned with brushes after the grill surface is heated in order to loosen the residue, this can be a dangerous scenario. That is, placing one hand on the grill brush handle (in the proper location) and a second hand on the brush body, closer to the bristles, also positions that second hand dangerously close to the hot grill surface, and the lack of a designated or effective hand-hold area in that region increases the risk that the second hand could easily slip off the brush body and onto the hot grill surface that is in close proximity thereto. Accordingly, it would be desirable to provide a grill brush having a handle structure to affect improved cleaning and reduce the risk of injury when cleaning the hot grill surface.

SUMMARY OF THE INVENTION

The object of the present invention is to overcome the drawbacks of the prior art, noted above.

According to a first embodiment of the present invention, a twisted wire grill brush is provided, comprising at least one handle having an extension direction, a first brush provided at an end of the handle, a second brush provided at an end of the handle, and a third brush provided at an end of the handle and arranged substantially perpendicular with respect to the extension direction of the handle.

Preferably, the first brush comprises a first twisted core wire, defined by a pair of core wires that are intertwined and twisted about one another along a first core axis, and a first brush region defined by a first pair of twisted (intertwined) spring coils extending about and pressed between at least a portion of the first twisted core wire. The first pair of spring coils of the first brush region is preferably arranged at an angle with respect to the extension direction of the handle. Preferably, the angle is in a range of 15-45°, more preferably about 22-30°, with respect to the extension direction of the handle.

Similarly, the second brush comprises a second twisted core wire, defined by a pair of core wires that are intertwined and twisted about one another along a second core axis, and a second brush region defined by a second pair of twisted (intertwined) spring coils extending about and pressed between at least a portion of the second twisted core wire. The second pair of spring coils of the second brush region is preferably arranged substantially parallel with respect to the first pair of spring coils of the first brush region, and also arranged at an angle with respect to the extension direction of the handle. Preferably, the angle is in a range of 15-45°, more preferably about 22-30°, with respect to the extension direction of the handle.

In addition, the third brush comprises a third twisted core wire, defined by a pair of core wires that are intertwined and twisted about one another along a third core axis, and a third brush region defined by a third pair of twisted (intertwined) spring coils extending about and pressed between at least a portion of the third twisted core wire. The third pair of spring coils of the third brush region is preferably arranged substantially perpendicular with respect to the extension direction of the handle.

According to one aspect of the first embodiment of the present invention, the third brush is attached to at least a portion of at least one of the first and second brushes, preferably both.

According to another aspect of the first embodiment, the first, second and third pairs of spring coils of the respective brush regions all have the same diameter.

According to another aspect of the first embodiment of the present invention, at least one of the first, second and third pairs of spring coils of the respective brush regions has a different diameter than the remainder of the first, second and third pairs of spring coils. In some embodiments, the first and second pairs of spring coils of the respective first and second brush regions each have the same diameter as one another, and the third pair of spring coils of the third brush region has a different diameter from that of the first and second pairs of spring coils of the first and second brush regions.

According to another aspect of the first embodiment of the present invention, the first and second pairs of spring coils of the first and second brush regions have the same length as one another, and have a different length from that of the third pair of spring coils of the third brush region. Preferably, the first and second pairs of coils of the first and second brush regions have a longer length than the length of the third pair of spring coils of the third brush region (i.e., the third brush region has a shorter length than the first and second brush regions).

According to a second embodiment of the present invention, a multi-handled twisted wire grill brush is provided, comprising a first handle having a first extension direction and having at least one brush provided at an end thereof, and a second handle having a second extension direction that is arranged at an angle with respect to the first extension direction, and having a brush provided at an end thereof. Preferably, an extension axis of at least one brush region of the at least one brush of the first handle is arranged at an angle with respect to the first extension direction of the first handle, and an extension axis of a brush region of the brush of the second handle is arranged substantially perpendicular with respect to the first extension direction of the first handle.

Preferably, the at least one brush of the first handle comprises a first brush and a second brush. The first brush comprises a first twisted core wire, defined by a pair of core wires that are intertwined and twisted about one another along a first core axis, and a first brush region defined by a first pair of twisted (intertwined) spring coils extending about and pressed between at least a portion of the first twisted core wire. The first pair of spring coils of the first brush region is preferably arranged at an angle with respect to the first extension direction of the first handle. Preferably, the angle is in a range of 15-45°, more preferably about 22-30°, with respect to the extension direction of the handle.

The second brush comprises a second twisted core wire, defined by a pair of core wires that are intertwined and twisted about one another along a second core axis, and a second brush region, and a second brush region defined by a second pair of spring coils extending about and pressed between at least a portion of the second twisted core wire. The second pair of spring coils of the second brush region is arranged substantially parallel with respect to the first pair of spring coils of the first brush region, and arranged at an angle with respect to the first extension direction of the first handle. Preferably, the angle is in a range of 15-45°, more preferably about 22-30°, with respect to the extension direction of the handle.

The third brush comprises a third twisted core wire, defined by a third pair of core wires that are intertwined and twisted about one another along a third core axis, and a third brush region defined by a third pair of spring coils extending about and pressed between at least a portion of the third twisted core wire. The third pair of spring coils of the third brush region is preferably arranged substantially perpendicular with respect to the first extension direction of the first handle.

According to one aspect of the second embodiment, the first, second and third pairs of spring coils of the respective brush regions all have the same diameter. According to another aspect of the present invention, at least one of the first, second and third pairs of spring coils of the respective brush regions have a different diameter than the remainder of the first, second and third pairs of spring coils. In some embodiments, the first and second pairs of spring coils of the first and second respective brush regions each have the same diameter as one another, and the third pair of spring coils of the third brush region has a different diameter from that of the first and second pairs of spring coils of the first and second brush regions.

According to another aspect of the second embodiment of the present invention, the first and second pairs of spring coils of the first and second brush regions have the same length as one another, and have a different length from that of the third pair of spring coils of the third brush region. Preferably, the first and second pairs of spring coils of the first and second brush regions have a longer length than the length of the third pair of spring coils of the third brush region (i.e., the third brush region has a shorter length than the first and second brush regions).

It is also preferred that the length of the first handle is longer than a length of the second handle.

In addition, in the second embodiment, it is preferred that at least a portion of the third twisted core wire is mechanically secured to at least a portion of at least one of the first and second twisted core wires, more preferably, both.

BRIEF DESCRIPTION OF THE DRAWINGS

The present invention is described in detail below in connection with the associated drawing figures, in which:

FIG. 3 is a left side view of the twisted wire grill brush 100 shown in FIG. 1A;

FIG. 4 is a right side view of the twisted wire grill brush 100 shown in FIG. 1A;

DETAILED DESCRIPTION OF THE INVENTION

Figure 1A:
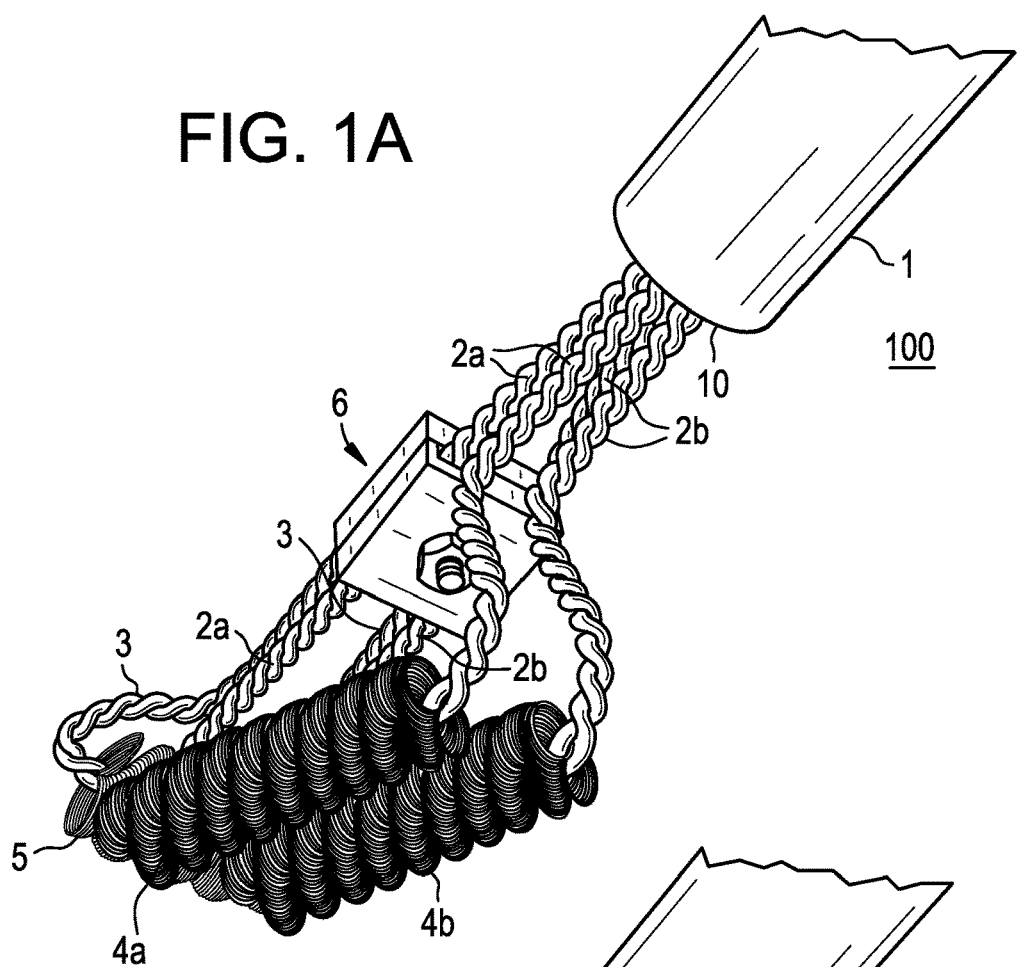
FIG. 1A is perspective bottom view of a twisted wire grill brush 100 according to a first embodiment of the present invention.
Figure 1B:
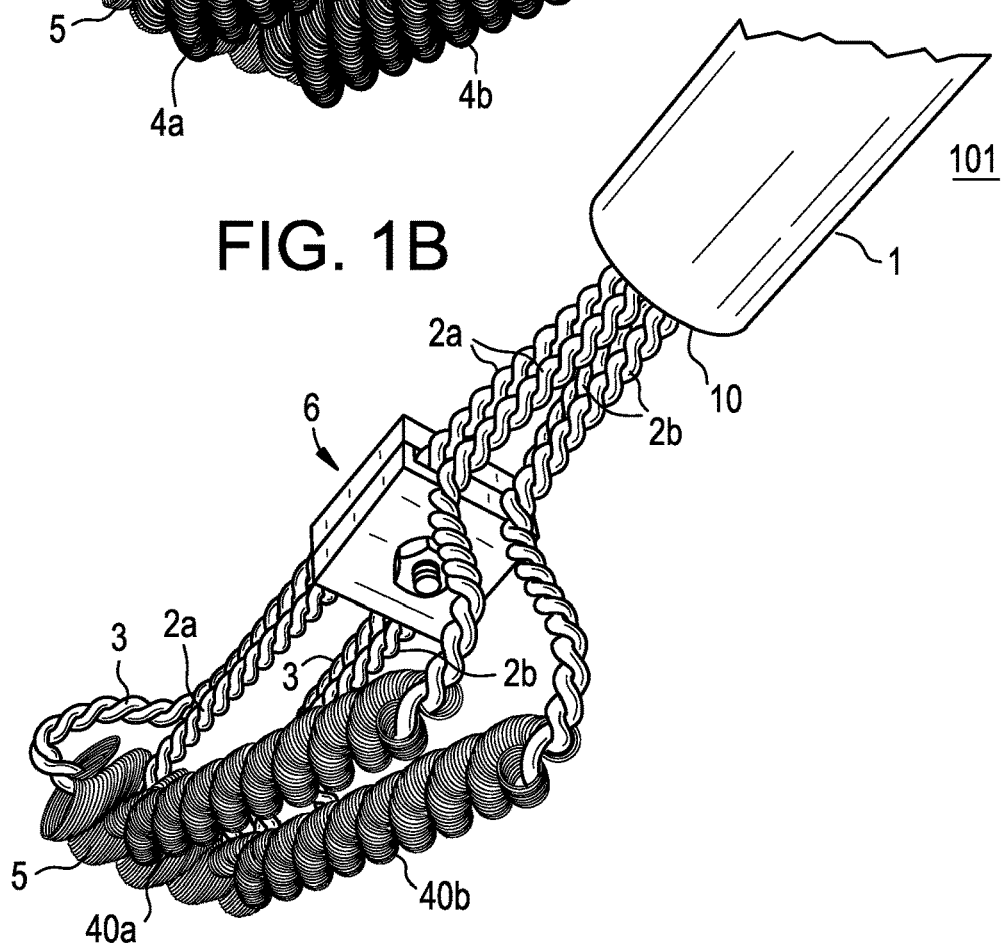
FIG. 1B is a is perspective bottom view of a twisted wire grill brush 101 according to another aspect of the first embodiment of the present invention.
Figure 2:
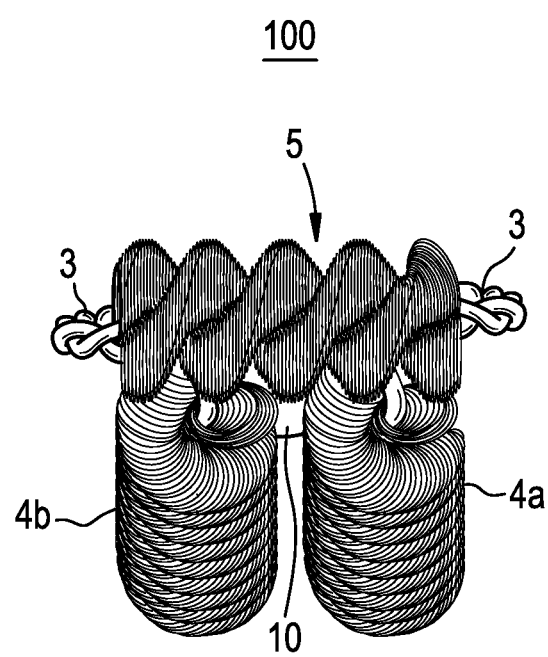
FIG. 2 is an end view of the twisted wire grill brush 100 shown in FIG. 1A.
Figure 5:
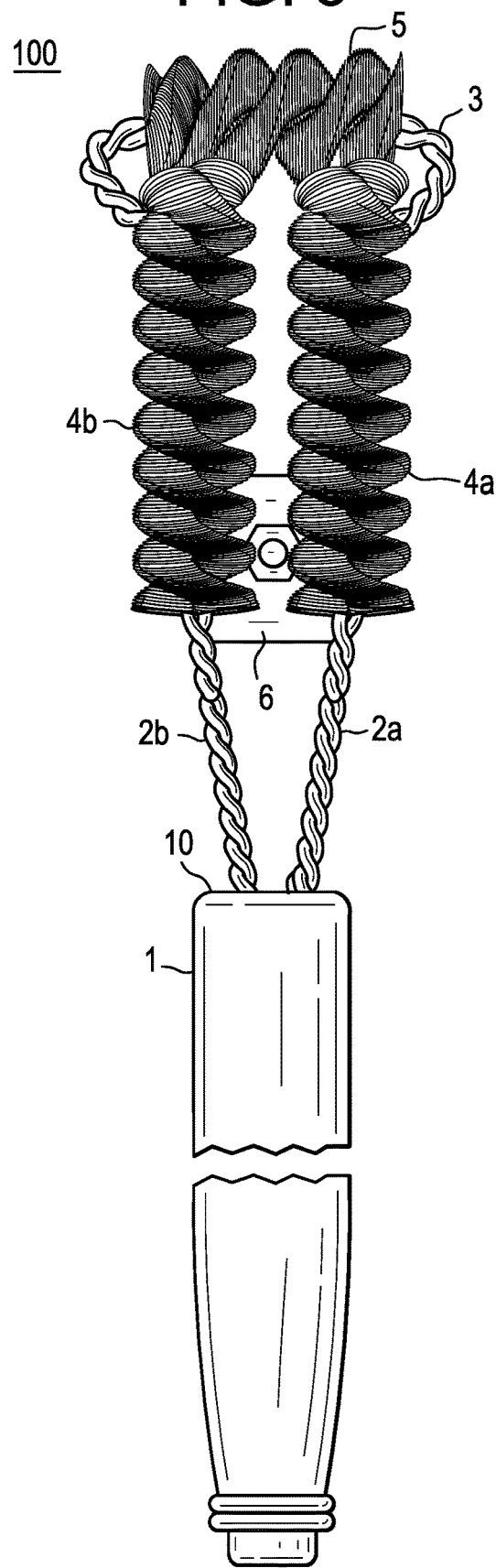
FIG. 5 is a bottom view of the twisted wire grill brush 100 shown in FIG. 1A.
Figure 6:
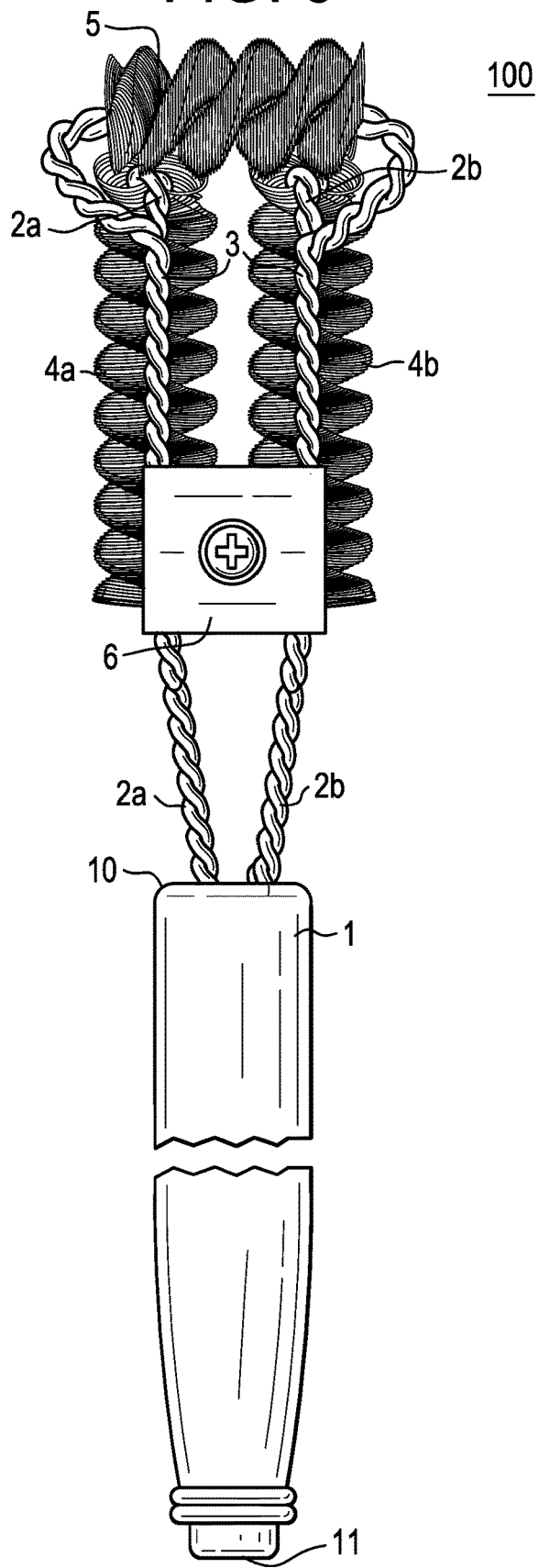
FIG. 6 is a top view of the twisted wire grill brush 100 shown in FIG. 1A.

FIG. 1A is perspective bottom view of a twisted wire grill brush 100 (hereinafter grill brush 100) according to a first embodiment of the present invention. FIG. 2 is an end view of the grill brush 100 shown in FIG. 1A, FIG. 3 is a left side view of the grill brush 100 shown in FIG. 1A, FIG. 4 is a right side view of the grill brush 100 shown in FIG. 1A, FIG. 5 is a bottom view of the grill brush 100 shown in FIG. 1A, and FIG. 6 is a top view of the grill brush 100 shown in FIG. 1A. FIG. 1B is a perspective bottom view of a grill brush 101 according to another aspect of the first embodiment of the present invention, wherein the parallel twisted spring coils 40a, 40b of the first and second brush regions have a coil diameter that is different (e.g., smaller) than that of the first and second brush regions defined by the spring coil pairs 4a, 4b shown in FIG. 1A.

As shown in FIGS. 1A-6, the grill brushes 100 and 101 each have a handle 1 that extends from a first end 10 thereof to an opposed second end 11, defining an extension direction of the handle 1. The length of the handle 1 is not critical, but can be in a range of 3 to 24 inches. The shape of the handle 1 is not critical, but the diameter of the handle 1 can be in a range of 0.5 to 2 inches, and is preferably substantially or entirely round or oval in cross-sectional shape to ensure sufficient grip comfort. The handle 1 can be made from any suitable material, including but not limited to wood materials and plastic materials. Preferably, the handle 1 is made of a polypropylene material, more preferably, a foam filled polypropylene.

The grill brushes 100, 101 each include at least 3 brushes, each having a brush region. The first brush is defined by a first twisted core wire 2a, which itself is defined by a pair of core wires that are intertwined and twisted about one another along a first core axis. The first twisted core wire 2a has a first end that is attached to the handle 1 proximate the first end 10 thereof, and a second end that is also attached to the handle 1 proximate the first end 10 thereof to define a first loop of the first brush. The first brush also includes a first brush region defined by a first pair of spring coils (4a in FIG. 1A, 40a in FIG. 1B) that are intertwined with one another and which extend about and are pressed between at least a portion of the first twisted core wire 2a.

The grill brushes 100, 101 also include a second brush, disposed adjacent and substantially parallel with respect to the first brush. The second brush includes a second twisted core wire 2b defined by a pair of core wires that are intertwined and twisted about one another along a second core axis. The second twisted core wire 2b has a first end that is attached to the handle 1 proximate the first end 10 thereof, and a second end that is also attached to the handle 1 proximate the first end 10 thereof to define a second loop of the second brush. The second twisted core wire 2b is spaced a distance from the first twisted core wire 2a in a direction that is substantially perpendicular with respect to the extension direction of the handle 1, so that the first and second loops of the first and second brushes are substantially parallel to one another, and do not intersect.

The second brush also includes a second brush region defined by a second pair of spring coils (4b in FIG. 1A, 40b in FIG. 1B) that are intertwined with one another and which extend about and are pressed between at least a portion of the second twisted core wire 2b. At least a portion of the second core axis of the second twisted core wire 2b is substantially parallel with respect to at least a portion of the first core axis of the first twisted core wire 2a, so that the first and second brush regions (defined by the respective spring coil pairs 4a, 4b, 40a, 40b) remain substantially parallel with respect to one another.

The grill brushes 100, 101 also include a third brush, including a third twisted core wire 3 defined by a pair of core wires that are intertwined and twisted about one another along a third core axis. The third twisted core wire 3 has a first end that is mechanically attached to the grill brush 100, 101 proximate, or in contact with, at least a portion of the first twisted core wire 2a via a fastening member 6, such as a clamp (as shown in the accompanying drawings Figures). The second end of the third twisted core wire 3 is also mechanically attached to the grill brush 100, 101 proximate, or in contact with, at least a portion of the second twisted core wire 2b via the fastening member 6, so as to define a third loop of the third brush. Preferably, the first and second ends of the third twisted core wire 3 are parallel with respect to at least the first and second ends of the first and second twisted core wires 2a, 2b.

The third brush also includes a third brush region defined by a third pair of spring coils 5 that are intertwined with one another and which extend about and are pressed between a substantially central portion of the third twisted core wire 3. The third core axis in the central portion of the third twisted core wire 3 extends in an axial direction, so that the third brush region (defined by the third pair of spring coils 5) is arranged substantially perpendicular with respect to the extension direction of the handle 1.

As shown in FIGS. 1-6, the first and second pairs of spring coils 4a, 4b, 40a, 40b of the first and second brush regions have a longer length than that of the third pair of spring coils 5 of the third brush region.

The core axes of the respective twisted core wires 2a, 2b and 3 each bend to extend in different directions along the respective lengths thereof so as to define the first, second and third loops. It is preferred that the third core axis at the first end of the third twisted core wire 3, proximate the fastening member (clamp) 6, is arranged to be substantially parallel with respect to the first core axis of the first twisted core wire 2a at the first end thereof (proximate the first end 10 of the handle 1), at the second end of the first twisted core wire 2a (proximate the first end 10 of the handle 1), and at a portion of the first core wire 2a proximate the fastening member 6. Likewise, it is also preferred that the third core axis at the second end of the third twisted core wire 3, proximate the fastening member (clamp) 6, is also arranged to be substantially parallel with respect to the second core axis of the second twisted core wire 2b at the first end thereof (proximate the first end 10 of the handle 1), at the second end of the second twisted core wire 2b (proximate the first end 10 of the handle 1), and at a portion of the second core wire 2b proximate the fastening member 6.

The twisted core wire pairs of the present invention are intertwined (e.g., twisted about each other) and twisted helically about a respective core axis to define the twisted core wires 2a, 2b and 3. The core wires of each twisted core wire pair (2a, 2b, 3) are intertwined so that each core wire abuts an adjacent core wire directly or with one or more wires from the respective spring coil pressed between. The spring coil pairs 4a, 4b, 5 extend about at least one core wire of the respective pairs and/or about each core wire of the pairs, so that each length of spring coil is pressed between the respective twisted core wires.

The core wires of each twisted core wire pair (2a, 2b, 3) are preferably strong enough to resist deformation in the twisted state and under the predetermined pressures that are normally or reasonably applied during cleaning. However, the core wires must also be deformable in the pre-twisted state under a greater, specified pressure that can be applied during formation of the twisted core wires and the brush. Suitable materials for the core wires core wires include, but are not limited to, galvanized steel, stainless steel, brass, other metallic materials, plastic, or other materials with similar structural characteristics. Preferably, the core wires are made of galvanized or stainless steel.

Suitable core wires can also range in diameter. For example, the diameter of the respective core wires can range from about 0.02 inches to about 0.2 inches. The core wires of each twisted core wire pair ($2a$, $2b$, $3$) illustrated in the accompanying Figures preferably have a diameter of about 0.092 inches. The diameter of the twisted core wire pairs $2a$, $2b$ and $3$ is about 0.05-0.2 in. It should be noted that the present invention is not limited to the dimensions shown in these Examples.

Each spring coil of the respective spring coil pairs ($4a$, $4b$, $40a$, $40b$ and $5$) that are intertwined with and pressed between the respective twisted core wires $2a$, $2b$ and $3$ is also selected, designed and incorporated into the brush to provide strength and durability. Suitable spring coils are made from coil wire selected from materials that include, but are not limited to, galvanized steel, stainless steel, brass, other metallic materials, plastic, or the like. In the exemplary embodiment depicted in the accompanying Figures, the spring coils of the respective spring coil pairs ($4a$, $4b$, $40a$, $40b$ and $5$) are preferably made of galvanized music wire.

As with the core wires, the diameter of the spring coil wire of the respective spring coil pairs ($4a$, $4b$ and $5$) can vary. Preferably, the spring coil wire diameter ranges from about 0.01 inches to about 0.07 inches. Along with the variation in the spring coil wire diameter, the number of coils per inch of spring coil length, when a spring coil is compressed axially so the coils all touch, can also vary. The spring core wire of the respective spring coil pairs $4a$, $4b$ has a diameter of about 0.125 to 0.75 inches, and each spring coil of the pairs $4a$, $4b$ has about 60 coils per inch of spring length with the spring compressed axially. It should be noted that the present invention is not limited to the dimensions shown in these Examples.

Each length of spring coil can be compressed axially so that at least a portion of each consecutive 360 degree turn around a coil axis, within a single spring coil, barring any aberrations in the uniformity of the spring coil, abuts in an axial direction an immediately preceding consecutive 360 degree turn. For example, it is conceivable that each 180 degree section of a turn abuts in an axial direction an immediately preceding consecutive 360 degree turn. It is further conceivable that each 90 degree section of a turn abuts in an axial direction an immediately preceding consecutive 360 degree turn. In addition, each 45 degree section of a turn can abut in an axial direction an immediately preceding consecutive 360 degree turn. Further, the spring coil can be compressed axially so that a majority of sections, or all sections, of each consecutive 360 degree turn abuts in an axial direction each immediately preceding consecutive 360 degree turn.

The axial compression adds strength to the grill brush by reducing or preventing axial deformation or deflection of individual 360 degree turns in each spring coil during use of the brush. For example, when each consecutive 360 degree turn around a coil axis abuts in an axial direction an immediately preceding consecutive 360 degree turn, then each 360 turn in each spring coil can lie in a plane approximately perpendicular to the core axis (e.g., perpendicular plus or minus the diameter of the coil wire, or any shift of one or more 360 turns away from perpendicular caused by manufacturing defect or by a force, the latter caused, e.g., by use, misuse, etc.), and the axial compression can resist any force acting to deflect any individual 360 turn of a spring coil out of the approximately perpendicular plane.

The spring constant of the spring coils can vary. A relatively strong spring constant helps each spring coil retain its shape and maintain the desired level of spacing between each 360 degree turn, which promotes a more rigid, stable brush. A relatively weak spring constant facilitates flexibility in the spring coil, which promotes a less rigid brush. Preferably, the spring constant of each spring coil is about 0.003-0.03 pounds force per square inch.

The diameter of suitable spring coils used in the respective brush sections can range greatly. In some embodiments, the diameter of the spring coils can range from about 0.125 inches to about 2.0 inches, depending on the material, the desired application, and other factors. In the embodiment shown in FIG. 1A, for example, the diameter of the spring coils $4a$, $4b$ is 0.5 inches, and in FIG. 1B, the diameter of the spring coils $40a$, $40b$ is about 0.25 inches. Spring coils $4a$, $4b$ ($40a$, $40b$) with equal diameters will produce a uniform twisted spring coil diameter $\phi_c$ across the axial length of the twisted spring coils, and a relatively high number of contact points against a flat, planar surface.

FIGS. 1A and 2-6 of the first embodiment, and FIGS. 7-10 of the second embodiment, show spring coils $4a$, $4b$ of the first and second brush regions each having an approximately equal diameter with respect to one another, and the diameters of the spring coils $40a$ and $40b$ of the first and second brush regions in FIG. 1B are likewise approximately equal to one another. It should be apparent, however, that the diameter of the respective spring coil pairs defining spring coils $4a$ and $4b$ of the first and second brush regions in FIG. 1A is larger than that of the respective spring coil pairs defining spring coils $40a$ and $40b$ of the first and second brush regions in FIG. 1B. That is the only difference between the grill brush $100$ shown in FIG. 1A and the grill brush $101$ shown in FIG. 1B.

The pair of spring coils defining the spring coil $5$ of the third brush region in the embodiments shown in FIGS. 1-10 has substantially the same diameter as that of the spring coils $4a$, $4b$ (first and second brush regions of grill brush $100$) and a different diameter than that of the spring coils $40a$, $40b$ (first and second brush regions of grill brush $101$). The diameter of the individual spring coils, as well as the intertwined pair of spring coils $5$, can be varied, as well. Preferably, the diameter of the spring coil pairs defining the twisted spring coil $5$ is in a range of 0.25-1 inch, more preferably about 0.5 inch.

It should also be noted that, while it is not shown in the drawings, it is conceivable that the each of the spring coils defining one pair of spring coils can have a different diameter, so that the resultant twisted spring coil pair has two coils of different diameter intertwined and twisted within a single brush region. Varying the spring coil diameters in this manner can be beneficial for certain purposes, or for cleaning certain non-flat surfaces. Further, the spring coil diameter of a single length of spring coil can vary, either gradually or in discrete steps.

As shown in FIG. 2, the spring coil $5$ of the third brush region is arranged to extend in a substantially perpendicular direction with respect to the extension direction (extension axis) of the handle $1$.

FIGS. 3 and 4 are left and right hand side view of the grill brush $100$ according to the first embodiment of the present invention. The arrangement of the three brush regions of the grill brush 100 are also shown in FIGS. 5 (planar bottom view) and 6 (planar top view).

As shown in FIG. 3, the first twisted core wire 2a extends from the first end 10 of the handle 1, is bent at several locations to change the first core axis direction from a direction that is initially parallel with respect to the extension direction of the handle 1, and loops back around so that the second end of the first twisted core wire 2a also extends into the handle 1 proximate the first end 10 thereof (i.e., the first core axis is again parallel with respect to the extension direction of the handle 1). This defines the first loop of the first brush.

A portion of the first twisted core wire 2a is provided with the twisted spring coil 4a, as described above, to define the first brush region, which is arranged at an angle of about 15-45°, preferably 22-30°, most preferably about 30° (with respect to the extension direction of the handle) in order to define a sufficient grill cleaning surface and facilitate sufficient scrubbing pressure when using the grill brush 100 to clean a grill.

Similarly, FIG. 4 shows that the second twisted core wire 2b extends from the first end 10 of the handle 1 in a direction that is initially parallel with respect to the extension direction of the handle 1, is bent at several locations to change the second core axis direction, and loops back around so that the second end of the second twisted core wire 2b also extends into the handle 1 proximate the first end 10 thereof (i.e., the second core axis is again parallel with respect to the extension direction of the handle 1). This defines the second loop of the second brush.

A portion of the second twisted core wire 2b is provided with the twisted spring coil 4b, as described above, to define the second brush region, which is arranged to be parallel with respect to the corresponding first brush region including the spring coils 4a, and which is likewise arranged at an angle with respect to the extension direction of the handle 1. Preferably, the angle is defined to be in a range of 15-45°, more preferably 22-30°, most preferably about 30° (with respect to the extension direction of the handle) in order to define a sufficient grill cleaning surface and facilitate sufficient scrubbing pressure when using the grill brush 100 to clean a grill.

The third twisted core wire 3, having the third brush region provided on a portion thereof, has another portion (remote from the brush region) that is mechanically fastened/connected to a portion of the grill brush 100 to define the third brush. Specifically, as shown, the third twisted core wire 3 extends from the mechanical fastening member (clamp) 6, is bent at several locations to change the third core axis direction from a direction that is initially parallel with respect to the extension direction of the handle 1 to a direction that is axial (i.e., substantially perpendicular) with respect to the extension direction of the handle 1, and loops back around so that the second end of the third twisted core wire 3 extends into and is held in place by the clamp 6 (i.e., the third core axis is again parallel with respect to the extension direction of the handle 1). This defines the third loop of the third brush. This fixation not only attaches the third twisted core wire 3 to the grill brush 100, but also lends more mechanical stability to the overall structure of the grill brush 100.

A substantially central portion of the third twisted core wire 3 is provided with the twisted spring coil 5, as described above, to define the third brush region. The third brush region is arranged on a portion of the third twisted core wire 3 that extends in the axial direction with respect to the extension axis (direction) of the handle 1 (i.e. is substantially perpendicular with respect to the extension direction of the handle 1). In conjunction with the first two brush regions, the third brush region provides increased surface area for scrubbing that can be applied to clean multiple angles of the grill surface, and enables improved pressure on the grill surface.

Figure 7:
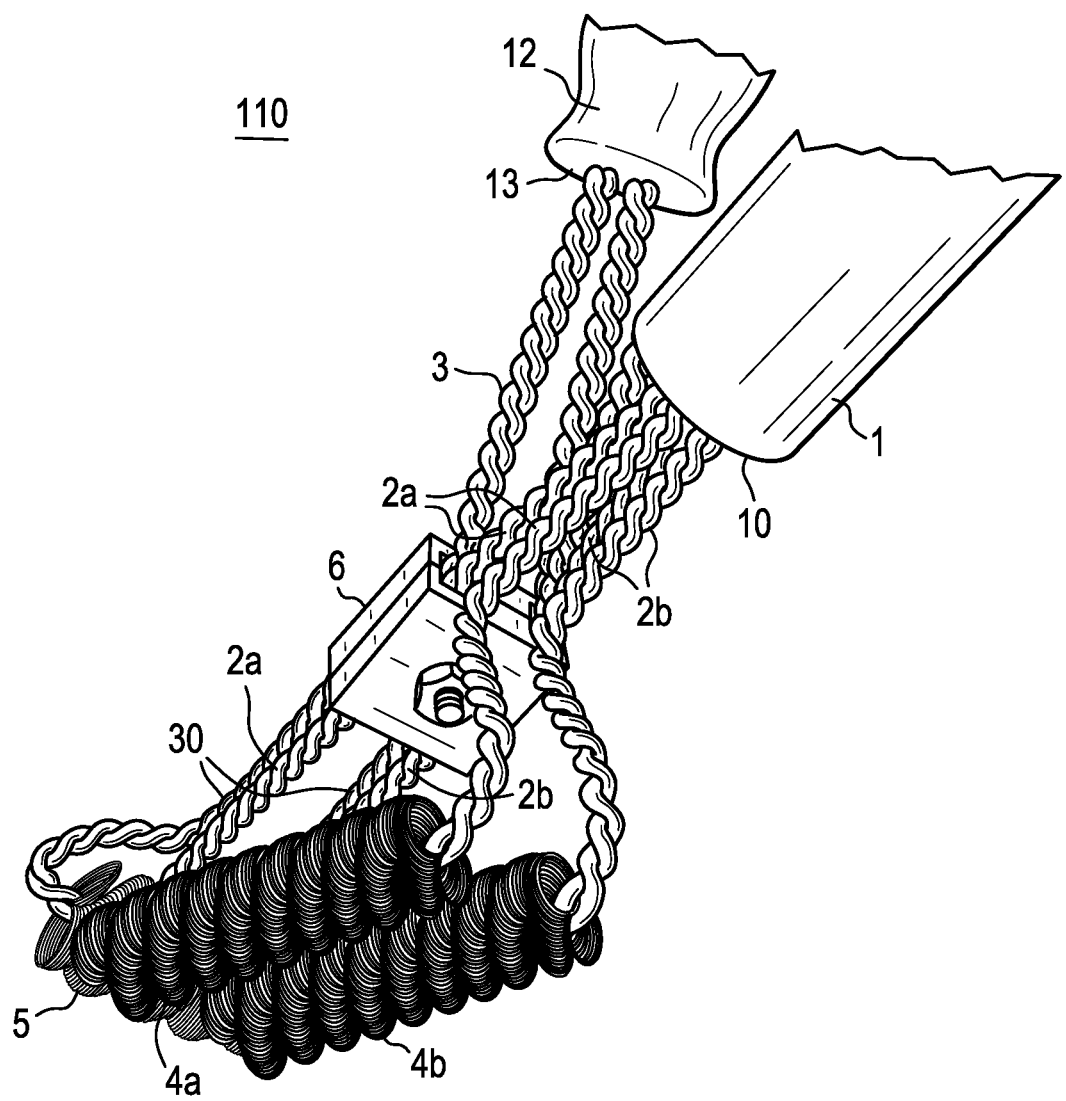
FIG. 7 is perspective bottom view of a multi-handled, twisted wire grill brush 110 according to a second embodiment of the present invention having three brushes substantially corresponding to those shown in FIG. 1A, but wherein the third brush is connected to the multi-handled, twisted wire grill brush via the second handle.
Figure 8:
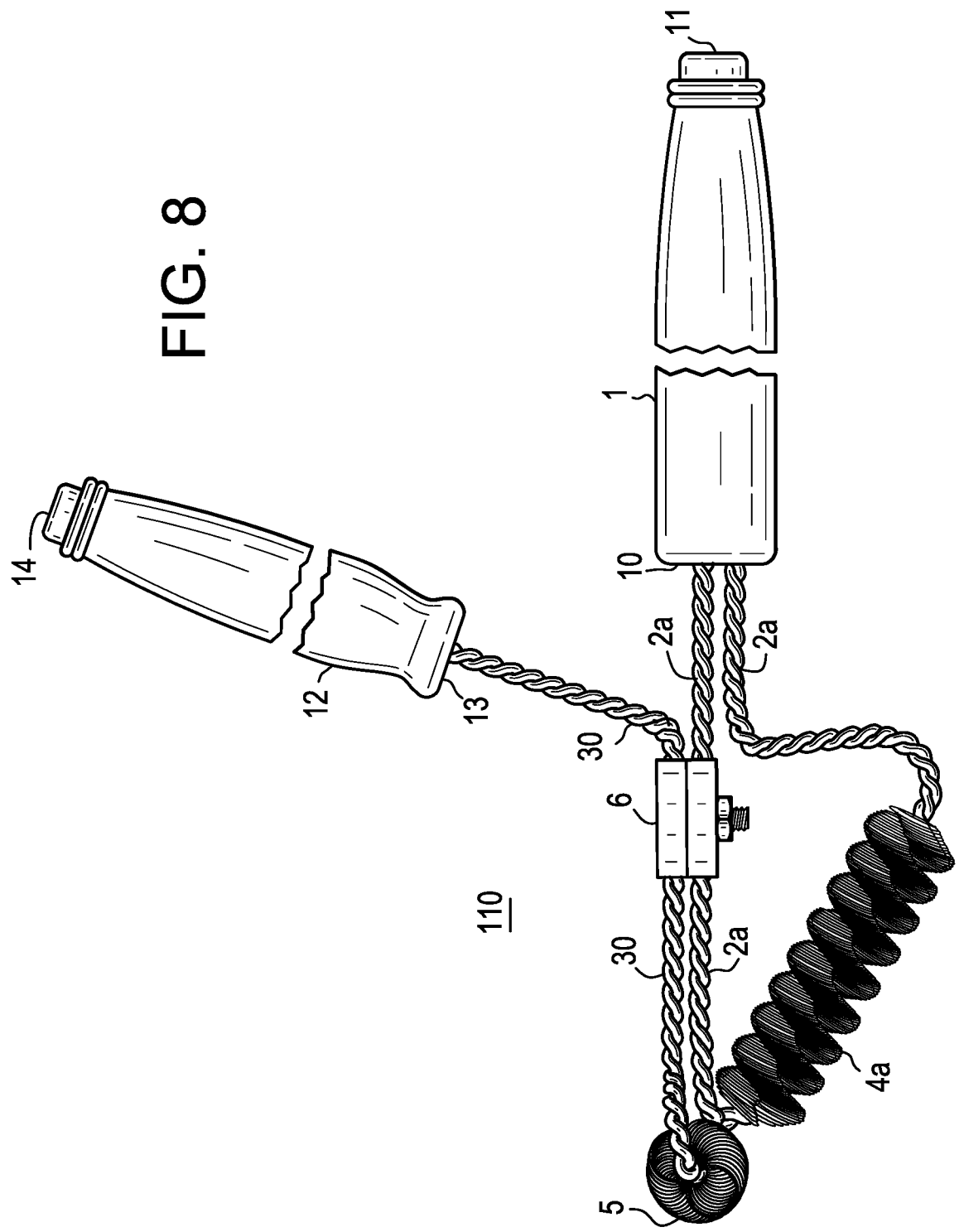
FIG. 8 is a left side view of the multi-handled twisted wire grill brush 110 shown in FIG. 7.
Figure 9:
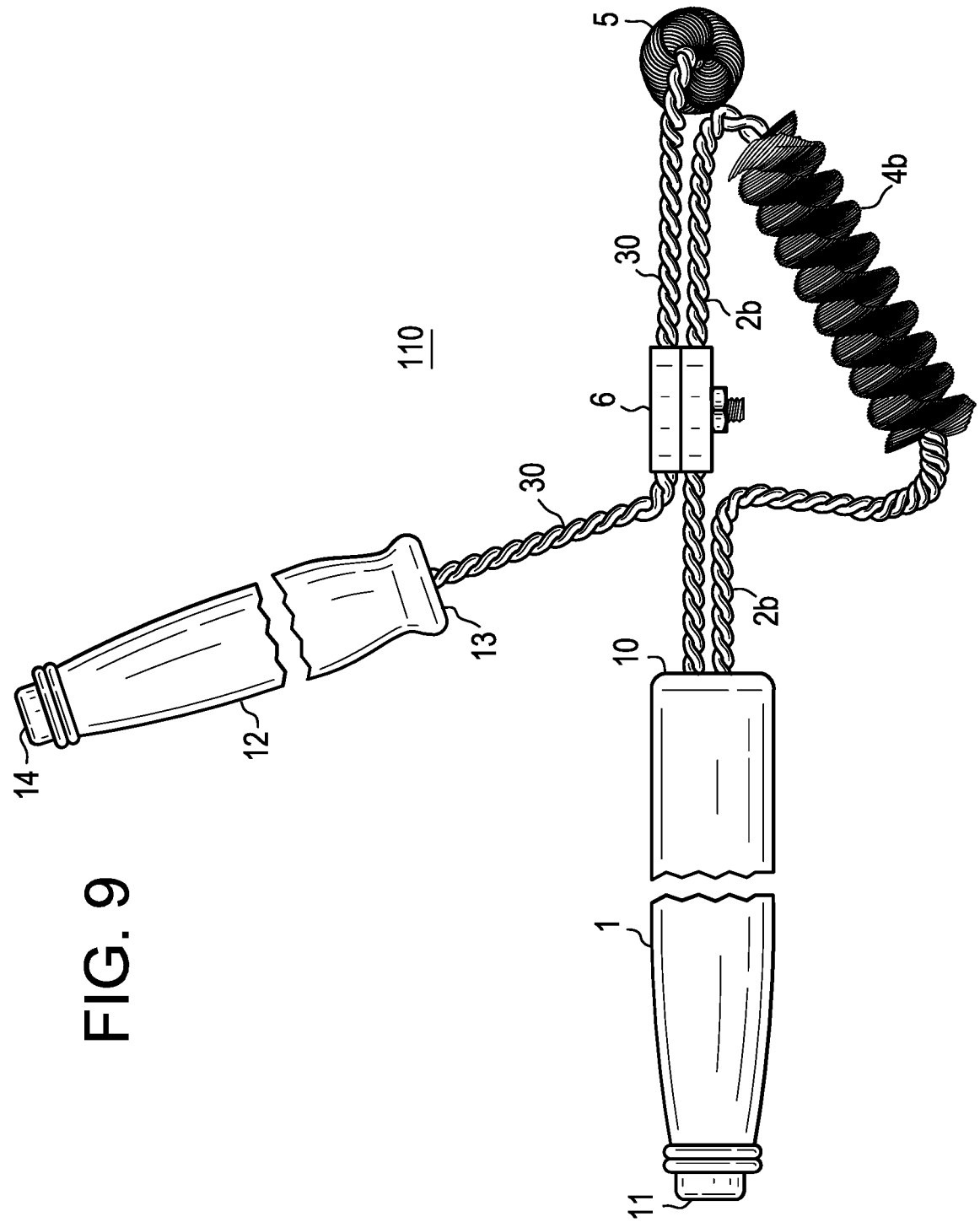
FIG. 9 is a right side view of the multi-handled twisted wire grill brush 110 shown in FIG. 7.
Figure 10:
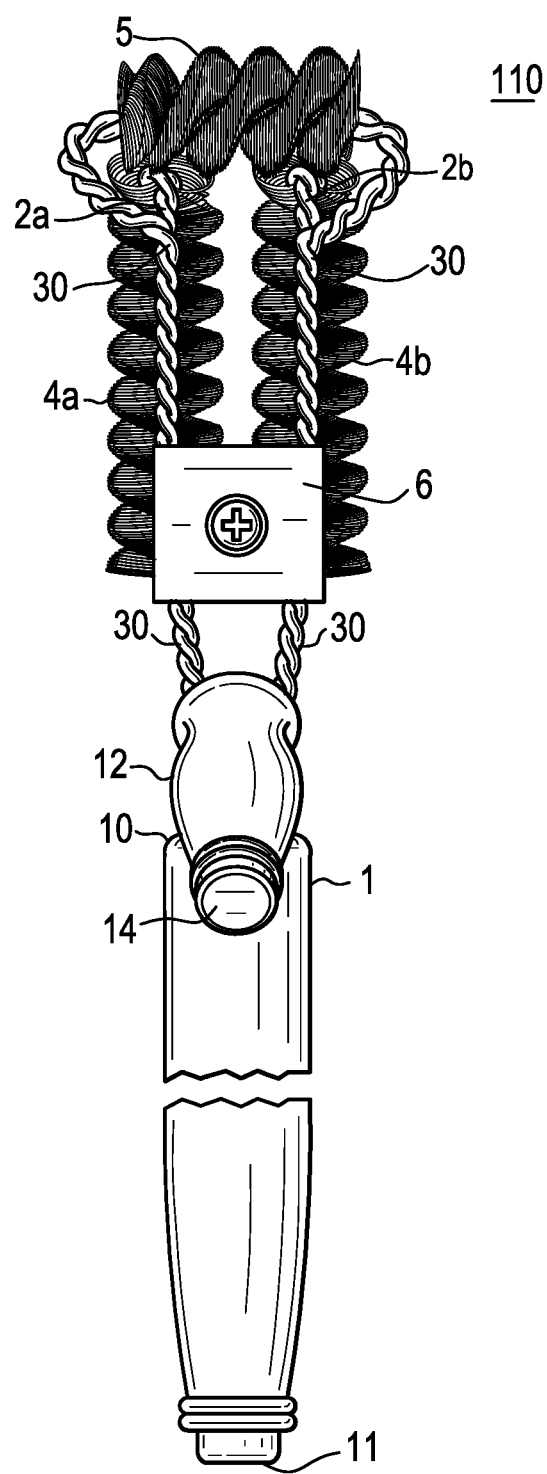
FIG. 10 is a top view of the multi-handled twisted wire grill brush 110 shown in FIG. 7.

FIG. 7 is a bottom perspective view of a multi-handled, twisted wire grill brush 110 (hereinafter grill brush 110) according to a second embodiment of the present invention. FIG. 8 is a left side view of the grill brush 110 shown in FIG. 7, FIG. 9 is a right side view of the grill brush 110, and FIG. 10 is a top view of the grill brush 110. A bottom view of the grill brush 110 is omitted, because such a bottom view would be substantially the same as that shown in FIG. 5 (i.e., the features relating to the second handle 12 and the way the third brush is connected to the second handle 12 would not be visible).

Most notably, the grill brush 110 has a multi-handled structure including at least two handles: a first handle 1; and a second handle 12 that is arranged and affixed at an angle with respect to the first handle 1.

The first handle 1 is substantially the same in size and shape as the handle 1 according to the first embodiment, and repeat descriptions of like elements are omitted. The second handle 12 extends from a first end 13 to a second end 14 thereof. The length of the second handle 12 is not critical, except that it must be suitably large enough to accommodate the grip of a second hand of the user, and can preferably be in a range of 2 to 12 inches. The shape of the handle is not critical, but the diameter of the handle is preferably in a range of 0.5 to 2 inches, and is preferably substantially or entirely round or oval in cross-sectional shape to ensure good grip comfort, like the handle 1. The handle 12 can be made from the same material as the handle 1 or from a different material than the handle 1. Suitable materials for the handle 12 include, but are not limited to wood materials and plastic materials. Preferably, the handle 12 is made of a polypropylene more preferably a foam filled polypropylene material.

As shown in FIGS. 7-10, the first handle 1 includes the first and second brush regions (of the first and second brushes) at an end thereof, in the same manner as described above in connection with the first embodiment. Repeat descriptions of identical elements are omitted. It should be noted, however, that the construction of the third brush of the grill brush 110 according to the second embodiment is different than that of the first embodiment.

That is, while many like elements are included, it should be clear from FIGS. 8 and 9, for example, that the third twisted core wire 30 is not affixed to the grill brush 110 simply via the clamp 6. Instead, the third twisted core wire 30 extends from a first end thereof proximate the first end 13 of the handle 12 in a direction that is initially parallel (co-axial) with respect to the second extension direction of the second handle 12 (and angled at about 70° (±5°) with respect to the first extension direction of the first handle 1). The twisted core wire 30 is bent at several locations to change the third core axis direction from a direction that initially runs at an angle of about 70° (±5°) with respect to the first extension direction of the first handle 1, to a direction that is parallel with the first extension axis of the first handle 1, and then to a direction that is axial (i.e., substantially perpendicular) with respect to the first extension direction of the first handle 1. The third twisted core wire 30 then loops back around so that the second end thereof likewise terminates at the first end 13 of the second handle 12, near (adjacent) but parallel to the connection point of the first end of the twisted core wire 30. This defines the third loop of the third brush of the grill brush 110, which, aside from the extension of the twisted core wire 30 and its connection points at the first end of the handle 12, is substantially the same as that described above in connection with the first embodiment.

That is, a substantially central portion of the third twisted core wire 30 is provided with the twisted spring coil 5, in the same manner as described above in connection with the first embodiment, to define the third brush region, which is arranged substantially perpendicular with respect to the first extension direction (i.e., longitudinal extension axis) of the first handle 1. In conjunction with the first and second brush regions, the third brush region provides increased scrubbing surface area that can be applied to clean the multiple angles of the grill surface, and enable improved pressure on the grill surface.

The angle of the second handle is preferably substantially perpendicular (i.e., 90° (±5°), and can range from about 75-90°, with respect to the extension axis of the parallel spring coils 4a, 4b to improve the leverage (z-axis force) for a user, so as to further increase the downward scrubbing pressure on the grill surface. The angle of the second handle is about 65-80°, preferably about 70° (±5°), with respect to first extension direction of the first handle. Since the second handle 12 has a sufficient length to be suitably gripped by the hand of a user, and is located a sufficient distance away from the hot grill surface that is in contact with the brush regions (defined by the spring coils 4a, 4b and 5), the chances of incurring hand injuries by using two hands to scrub the grill are reduced, if not eliminated altogether. Indeed, a user can securely grip the grill brush 110 using both hands and be able to apply enough force to effectively clean multiple angles of even the most soiled grill, further aided by the increased surface area provided by the unique brush arrangement described above, without risking injury.

At least a portion of the third twisted core wire 30 is affixed in proximity to respective portions of the first and second twisted core wires 2a, 2b using the fastening member (clamp) 6, as shown in FIGS. 7-10. The location of the clamp 6 is selected to allow for enough flex for the spring coils to separate as needed to clean but still confirm to the shape of the grill. As described above and shown in the accompanying drawing figures, a clamp 6 is one example of a suitable fastening member, and is suitably made of aluminum, plastic or steel materials. It should be noted, however, that other types of fastening members can also be used in connection with the present invention, including but not limited to crimping clips or any other suitable mechanical mechanism. This fixation lends more mechanical stability to the overall structure of the brush 110.

As shown in FIG. 10, the top view of the grill brush 110 is similar in appearance to the top view of the grill brush 100 shown in FIG. 6, although the connection mechanism of the third twisted core wire 30 at the first end of the second handle and the presence of the second handle 12 itself are notably different. These differences are most clearly shown in a comparison between FIGS. 3 and 4 and FIGS. 8 and 9, as described above.

While the present invention has been shown and described above with reference to specific examples, it should be understood by those skilled in the art that the present invention is in no way limited to these examples, and that variations and modifications can readily be made thereto without departing from the scope and spirit of the present invention.

What is claimed is:

1. A twisted wire grill brush, comprising:
   at least one handle extending from a first end to an opposed second end defining a straight extension direction of the at least one handle;
   an individual first brush provided at the first end of the handle;
   an individual second brush provided separately from the first brush at the first end of the at least one handle and arranged substantially parallel with respect to the first brush; and
   an individual third brush provided at the first end of the at least one handle and arranged substantially perpendicular with respect to the straight extension direction of the at least one handle;
   wherein at least a part of the third brush is physically attached to at least a portion of at least one of the first and second brushes.

2. The twisted wire grill brush according to claim 1, wherein the first brush comprises a first twisted core wire defined by a pair of core wires intertwined and twisted about one another along a first core axis, and a first brush region defined by a first pair of spring coils extending about and pressed between at least a portion of the first twisted core wire.

3. The twisted wire grill brush according to claim 2, wherein the second brush comprises a second twisted core wire defined by a pair of core wires intertwined and twisted about one another along a second core axis, and a second brush region defined by a second pair of spring coils extending about and pressed between at least a portion of the second twisted core wire, wherein the second brush region is arranged substantially parallel with respect to the first brush region.

4. The twisted wire grill brush according to claim 3, wherein the third brush comprises a third twisted core wire defined by a pair of core wires intertwined and twisted about one another along a third core axis, and a third brush region defined by a third pair of spring coils extending about and pressed between at least a portion of the third twisted core wire, wherein the third brush region is arranged substantially perpendicular with respect to the straight extension direction of the at least one handle.

5. The twisted wire grill brush according to claim 4, wherein a length of the first brush region and a length of the second brush region are larger than a length of the third brush region.

6. The twisted wire grill brush according to claim 2, wherein the first and second brush regions are arranged at an angle with respect to the straight extension direction of the at least one handle.

7. The twisted wire grill brush according to claim 6, wherein the first and second brush regions are arranged at an angle in a range of 15-45° with respect to the straight extension direction of the at least one handle.

8. The twisted wire grill brush according to claim 7, wherein the first and second brush regions are arranged at an angle in a range of 30° with respect to the straight extension direction of the at least one handle.

9. The twisted wire grill brush according to claim 2, wherein the first brush region is pressed between only a portion of the first twisted core wire.

10. The multi-handled, twisted wire grill brush according to claim 1, wherein the lengths of the first and second brushes are the same as one another.

11. A multi-handled, twisted wire grill brush, comprising:
- a first handle extending from a first end to an opposed second end defining an extension direction of the first handle and having at least one brush provided at the first end thereof; and
- a second handle extending from a first end to an opposed second end defining an extension direction of the second handle, which is arranged at an angle with respect to the extension direction of the first handle, and having a brush provided at the first end thereof;
- wherein an extension axis of the at least one brush of the first handle is arranged substantially parallel with respect to the extension direction of the first handle; and
- wherein an extension axis of the brush of the second handle is arranged at an angle of 70°±5° with respect to the extension direction of the first handle and substantially perpendicular with respect to at least a part of the at least one brush of the first handle.

12. The multi-handled, twisted wire grill brush according to claim 11, wherein the at least one brush provided at the first end of the first handle comprises a first brush and a second brush.

13. The multi-handled, twisted wire grill brush according to claim 12, wherein the first brush comprises a first twisted core wire, defined by a pair of core wires that are intertwined and twisted about one another along a first core axis, and a first brush region defined by a first pair of spring coils extending about and pressed between at least a portion of the first twisted core wire.

14. The multi-handled, twisted wire grill brush according to claim 13, wherein the second brush comprises a second twisted core wire, defined by a pair of core wires that are intertwined and twisted about one another along a second core axis, and a second brush region defined by a second pair of spring coils extending about and pressed between at least a portion of the second twisted core wire, wherein the second brush region is arranged substantially parallel with respect to the first brush region.

15. The multi-handled, twisted wire grill brush according to claim 14, wherein the brush at the first end of the second handle comprises a third twisted core wire, defined by a pair of core wires that are intertwined and twisted about one another along a third core axis, and a third brush region defined by a third pair of spring coils extending about and pressed between at least a portion of the third twisted core wire, wherein the third brush region is arranged substantially perpendicular at least with respect to the extension direction of the first handle.

16. The multi-handled, twisted wire grill brush according to claim 15, wherein a length of the first brush region and a length of the second brush region are both larger than a length of the third brush region.

17. The multi-handled, twisted wire grill brush according to claim 14, wherein the first and second brush regions are arranged at an angle in a range of 15-45° with respect to the extension direction of the first handle.

18. The multi-handled, twisted wire grill brush according to claim 14, wherein the first and second brush regions are arranged at an angle of about 30° with respect to the extension direction of the first handle.

19. The multi-handled, twisted wire grill brush according to claim 14, wherein the first and second brush regions are arranged at an angle that is substantially perpendicular with respect to the extension direction of the second handle.

20. The multi-handled, twisted wire grill brush according to claim 11, wherein a length of the first handle is greater than a length of the second handle along the respective extension directions.

* * * * *